April 8, 1969 G. H. TAUSCH 3,437,964
RELIEF VALVE FOR PROTECTING A DIFFERENTIAL PRESSURE TRANSDUCER
Filed Nov. 2, 1967
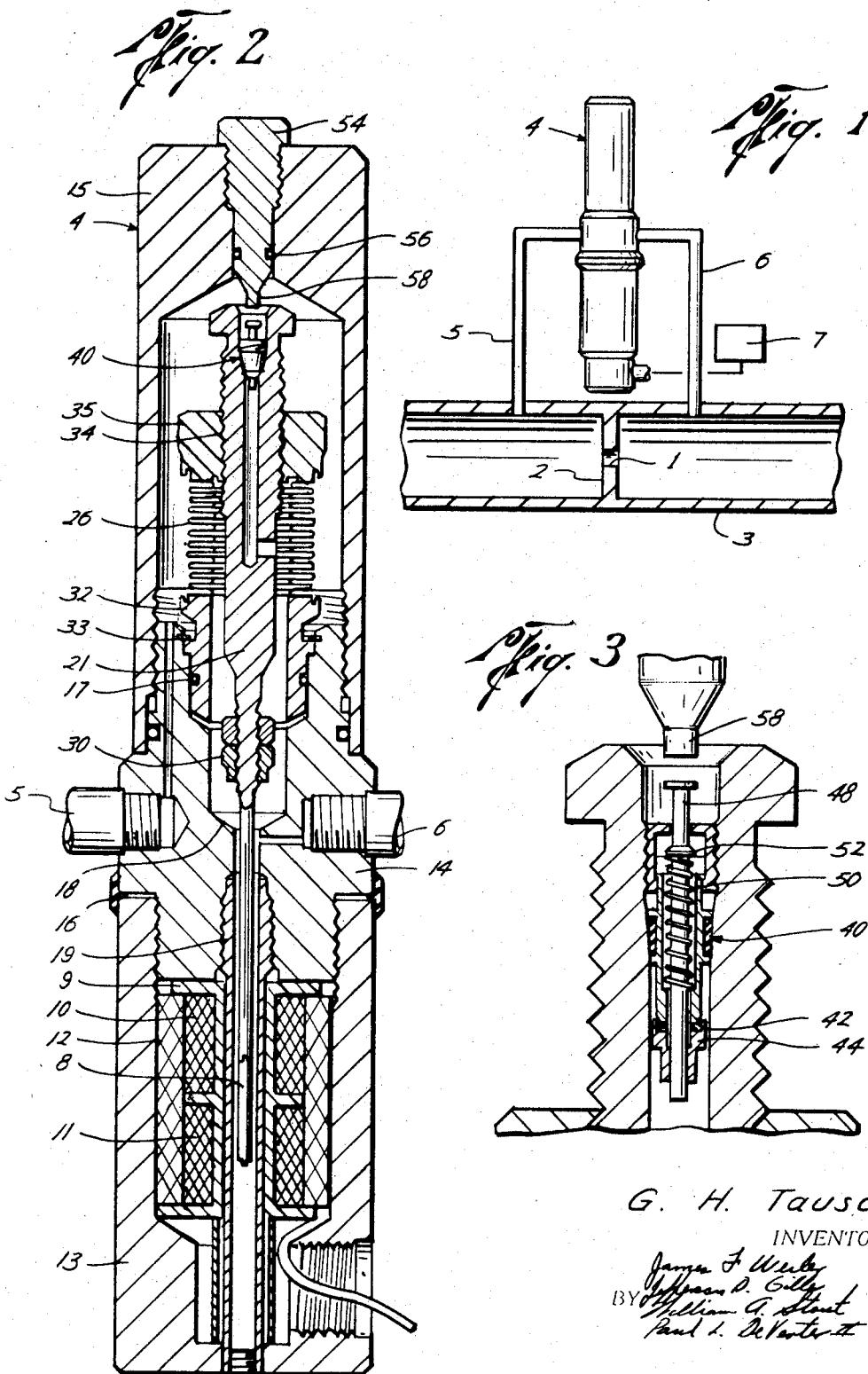
G. H. Tausch
INVENTOR.
BY
ATTORNEYS United States Patent Office
3,437,964
Patented Apr. 8, 1969

1

3,437,964
RELIEF VALVE FOR PROTECTING A DIFFERENTIAL PRESSURE TRANSDUCER
Gilbert H. Tausch, Houston, Tex., assignor to Camco Incorporated, Houston, Tex., a corporation of Texas
Filed Nov. 2, 1967, Ser. No. 680,136
Int. Cl. H01f 21/04
U.S. Cl. 336—30          4 Claims

ABSTRACT OF THE DISCLOSURE

In an electromechanical transducer having a differential transformer including relatively movable armature and coil members and a bellows connected to one of the members and movable in response to and measuring the differential fluid pressures on opposite sides thereof, a relief valve in which both the valve seat and valve element are connected to and move with only one of the members for providing pressure relief thereby protecting the bellows. A relief valve having a valve seat and valve element seated on the valve seat but allowing disengagement of the valve element upon a predetermined fluid pressure differential across the seat in a first direction, and stop means aligned with the valve element for disengagement of the valve element from the seat when the valve is moved in said second direction by the bellows upon a predetermined fluid pressure differential across the seat in a second direction.

Background of the invention

The present invention relates to a fluid flow measuring apparatus in which an electromechanical transducer responds to fluid pressure differential upstream and downstream of an orifice within a flow pipe and produces a voltage signal in proportion to the pressure differential. A differential pressure transducer generally uses a movable partition such as a bellows which is exposed on opposite sides to the differential pressures to be measured and which will have a long life of carefree service under usual and normal pressure conditions.

However, in order to protect and save the movable partition or bellows from harmful strains incident to the expected but generally infrequent imposition of abnormal high pressure differentials in one or both directions across the bellows a suitable relief valve is generally provided. Such structures are shown in my Patent Nos. 3,328,733 and 3,289,479. However, in some environmental conditions, the relief valve components will move relative to each other causing relative movement between the measuring members and thus produce an erroneous readout signal. The present invention is directed to improvements in a relief valve by connecting both the valve seat and valve element of the relief valve to only one of the measuring members whereby any change in the seating relationships in the valve such as any wear or change in dimensions of the sealing member of the relief valve such as due to temperatures or exposure to various types of fluids will not affect the readout of the transducer.

Summary

The present invention is directed to an improvement in a relief valve for protecting a differential pressure transducer by providing a valve having a valve seat and valve member which is supported and moves as a unit so that changes in the seating relationship in the valve does not affect the readout of the transducer.

A further object of the present invention is a provision of a relief valve for protecting a bellows actuated differential pressure transducer by having a valve seat and valve element both of which are connected to and movable with only one of the measuring members and having a biasing means normally holding the valve element seated on the valve seat but allowing disengagement of the valve element from the seat upon a predetermined fluid pressure differential across the seat in a first direction, and having the valve element positioned to engage a stop means aligned with the valve element for disengagement of the valve element from the valve seat when a predetermined fluid pressure differential acts across the seat in a second direction and moves the valve element into contact with the stop means thereby opening the valve.

Yet a still further object of the present invention is the improvement in a relief valve in an electromechanical transducer having a differential transformer including relatively movable armature and coil members in which the relief valve includes a valve seat and valve element, the valve being secured to and movable with the armature with spring means normally holding the valve element seated on the valve seat but allowing the valve element to move off of the seat on a predetermined fluid pressure differential in a first direction acting against the spring, and a valve stem is provided connected to the valve element and extends in a second direction and is positioned to engage a stop for disengagement of the valve element from the seat upon a predetermined fluid pressure differential across the seat in a second direction which moves the bellows, armature and valve in the second direction.

A brief description of the drawing

In the attached drawings, like character references refer to like parts through the several views in which, FIGURE 1 is a diagrammatic view of a system installation, partly in cross section, FIGURE 2 is an enlarged elevational view, in cross section, of the improved transducer assembly, and FIGURE 3 is an enlarged fragmentary elevational view, in cross section, of the relief valve of the present invention.

Description of the preferred embodiment

Referring now to the drawings, and particularly FIGURE 1, an orifice 1 of predetermined size is provided in a plate 2 within a pipeline 3 so that the differential and pressures upstream and downstream of the metered orifice varies with the flow of fluid and is utilized for measuring fluid flow through the line 3. Fluid pressures on both sides of and immediately adjacent the orifice plate 2 are communicated into a chambered housing generally indicated by the numeral 4 having a flexible partition wall or bellows 26 (FIGURE 2). Assuming that the flow is from left to right through the orifice 1, the upstream and normally higher pressure side of the orifice is in communication with one side of bellows 26 through line 5 and the opposite side of the partition or bellows 26 is connected through a line 6 with the downstream or normally lower pressure side of the orifice 1. Displacement of the bellows 26 by differences in the opposing fluid pressures is transmitted to a moving element of a differential transformer for producing a voltage proportional to the displacement from either side of its electric center and the voltage is transmitted to an instrument 7 for measuring or recording the fluid flow.

As best seen in FIGURE 2, the differential transformer may include an armature or ferrite rod core 8 having a stem 21 and shiftable axially within a spool 9 to either side of null position with reference to a pair axially spaced apart secondary coils 10 and 11 wound on the spool 9 and surrounded by a primary coil 12. Off center displacement of the armature 8 provides a higher or lower voltage in the respective secondary coil dependent upon the relative lengths of the armature 8 within each coil. The transformer coil and spool assembly is housed in the hollow transducer body 4 conveniently made up of a lower cup 13, a tubular member 14 and an upper cup 15 threaded together end to end succession. An elastic band 16 bridges adjoining ends of the medial body 14 and the end cup 13 as a seal to minimize leakage through the connecting threads. An O-ring 17 is provided for sealing at the connecting threads of the body 14 and in cup 15. The central bore in the tubular body member 14 is stepped in diameter to provide an upwardly facing internal shoulder 18 and the bore is projected downwardly through tube 19, projecting to the bottom of the lower cup member 13. The tube 19 receives the armature 8 and is surrounded by and centers the coil spool 9 whose opposite ends are clamped against the bottom of the body 14 in a space or sleeve 20 resting on the base of the coil enclosing bottom cup 13. Generally, the above description is shown in Patent No. 3,328,733.

A partition such as bellows 26, preferably a spring metal bellows of relatively thin wall stock is provided one end of which is connected to a support 32 which in turn is secured to and sealed to the top of the medial body member 14 by a locking ring 33. The position of the armature 8 and its stem 21 is controlled by a threaded connection 34 to a bellows ring 35 which is connected to and sealed to the top of the bellows 26. The threaded connection 34 may be suitably adjusted to initially position the armature 8 in its null position when the actuating pressures within the transducer are in balance.

The present invention is directed to providing a relief valve generally indicated by the numeral 40, similar to a Dill valve, and threadably and sealably secured in an opening in the top of the armature stem 21 and including a valve seat 42 and valve element 44 having a seal 46. Valve element 44 includes a valve stem 48 and a biasing means such as spring 50 acts on a shoulder 52 on the valve stem 48 to yieldably urge and normally hold the valve element 44 seated on the valve seat 42, but allows disengagement of the valve element 44 from the seat 42 upon a predetermined fluid pressure differential acting downwardly on the valve 40.

A stop plug 54 may be provided threadably and sealably secured to the cup 15 by a seal 56 and may include a stop shoulder 58 aligned with the valve element 48 for engaging and moving the valve stem and valve element 44 off of the seat 42 in the event the bellows 26 moves upward carrying the armature stem 20 and valve 40 causing the valve stem 48 to come into contact with the stop 58.

The hollow cup 15 in cooperation with the central bore through the body member 14 provides an internal chamber which is partitioned by the bellows 26 and the relief valve 40. The enclosed chamber internally of the partition 26 communicates below the shoulder 18 with a threaded port for connection with line 6. Pipe pressure downstream of the orifice 1 is present within the bellows 26 and tends to distend the bellows as well as to raise the transformer armature 8. Externally of the bellows 28 the chamber communicates with a threaded port for connection with the line 5. Pipeline pressure upstream of the orifice 1 is present exteriorly of the bellows 26 and tends to depress the bellows and also the transformer armature 8.

In the absence of pressure differential within the transducer chamber which is in excess of a predetermined range, the valve element 44 will remain seated on the valve seat 42 of the relief valve 42 and the valve 40 will travel upwardly and downwardly with the armature 8 in response to pressure differences across the bellows 26. It is to be noted that any change in the relationship between the valve element 44 and the valve seat 42 such as might be due to wear on the valve seat, or change in the dimensions of the seal 46 because of exposure to temperature and fluids in the system will not cause any change in position of the armature 8 so as to cause an erroneous readout signal.

Should upstream pressure in the pipeline and line 5 increase in relation to the downstream pressure to an extent beyond a predetermined safety range and which excess could do harm to the bellows 26, the pressure differential will overcome the spring 50 and the relief valve 40 causing the valve element 44 to move off of the valve seat 42 for effecting pressure equalization on opposite sides of the bellows 26. In addition, a stop abutment member such as a polytetrafluorethylene sleeve 30 engages the shoulder 18 to close communication with the downstream side of the orifice 1 so that pipeline fluid cannot flow through the transducer and bypass the orifice 1. Upon reduction of excessive upstream pressure, the spring 50 will again overcome the high upstream pressure and move the valve element 44 back into a sealing relationship with the seat 42 so that normal operation and measurement will continue.

If for any reason downstream pressure in line 6 so greatly exceeds pressure upstream of the orifice 1 so as to present danger of stress injury to the bellows 26, the pressure differential will raise the top of the bellows 26, carrying the armature stem 21 and the valve 40 thereby bringing the valve stem 48 into engagement with the stop 58 and opening the valve 40, again effecting pressure equalization on opposite sides of the bellows 26. Upon reduction of excessive pressure from the low pressure side, the bellows again retracts carrying the armature stem 21 and the valve 40 downwardly and moving the valve stem 48 out of contact with the stop 58 again allowing the spring 50 to reseat the valve element 44 on the valve seat 42 so that normal pressure measurement may be made.

The present invention, therefore, is well adapted to carry out the objects and attain the ends and advantages mentioned as well as others inherent therein. While a presently preferred embodiment is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In an electromechanical transducer having a differential transformer including relatively movable armature and coil members, a chambered body fixedly mounted relative to one of the members, a pair of pressure fluid inlet connections communicating with spaced apart regions of the chamber within the body, a resilient wall chamber partitioning means separating the chamber regions and responsive in movement to differential fluid pressures on opposite sides thereof and having one portion secured to the body and the other portion connected to and movable with the second member, the improvement comprising, a valve including a valve seat and a valve element, said valve being secured to and movable with the second member, biasing means yieldably urging the valve element into a seated relationship with valve seat, but allowing movement of the valve element off the seat upon a predetermined fluid pressure differential across the seat in a first direction.

2. The apparatus of claim 1 including, stop means aligned with the valve element for disengagement of the valve element from the seat when a predetermined fluid pressure differential acts across the seat in a second direction to move the valve element into contact with the stop means.

3. In an electromechanical transducer having a differential transformer including relatively movable armature and coil members, a chambered body fixedly mounted relative to one of the members, a pair of pressure fluid inlet connections communicating with spaced apart regions of the chamber within the body, a resilient wall chamber partitioning means separating the chamber regions and responsive in movement to differential fluid pressures on opposite sides thereof and having one portion secured to the body and the other portion connected to and movable with the second member, the improvement comprising, a valve including a valve seat and a valve element connected to and movable with the said second member, biasing means normally holding the valve element seated on the valve seat, but allowing disengagement of the valve element from the seat upon a predetermined fluid pressure differential across the seat in a first direction, and a valve stem connected to the valve element and positioned to engage the housing for disengagement of the valve element from the seat upon a predetermined fluid pressure differential across the seat in a second direction.

4. In an electromechanical transducer having a measuring transformer including relatively movable armature and coil members, a chambered body fixedly mounted relative to the coil members, a pair of pressure fluid connections communicating with spaced apart regions of the chamber within the body, a resilient bellows wall separating the chamber regions and responsive in movement to differential fluid pressures on opposite sides thereof and having one portion secured to the body and the other portion connected to and moving the armature, the improvement comprising, a relief valve including a valve seat and a valve element, said valve being secured to and movable with the armature, spring means normally holding the valve element seated on the valve seat, but allowing disengagement of the valve element from the seat upon a predetermined fluid pressure differential in a first direction acting against the spring, a valve stem connected to the valve element and positioned to engage the housing for disengagement of the valve element from the seat upon a predetermined fluid pressure differential acting across the seat in a second direction and moving the bellows, valve and armature in said second direction.

References Cited
UNITED STATES PATENTS

| | | | |
|---|---|---|---|
| 3,142,794 | 7/1964 | Pegram | 336—30 XR |
| 3,289,479 | 12/1966 | Tausch | 73—407 |
| 3,328,733 | 6/1967 | Tausch | 336—30 |

DARRELL L. CLAY, *Primary Examiner.*

T. J. KOYMA, *Assistant Examiner.*

U.S. Cl. X.R.

73—407, 410